J. V. N. DORR.
SETTLING APPARATUS.
APPLICATION FILED FEB. 2, 1920.
1,434,597.
Patented Nov. 7, 1922.
2 SHEETS—SHEET 1.
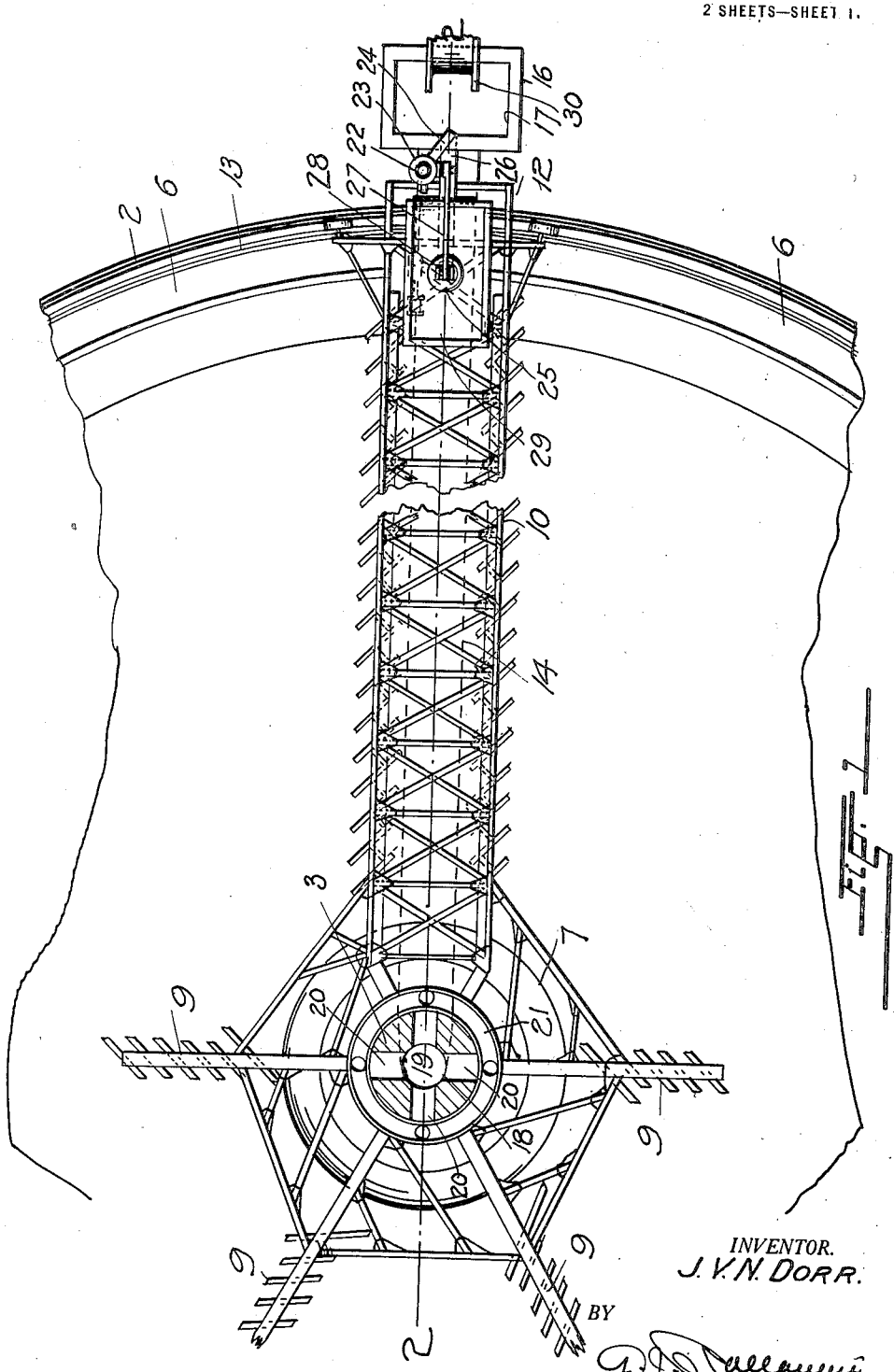
INVENTOR.
J. V. N. DORR.
BY
ATTORNEY.

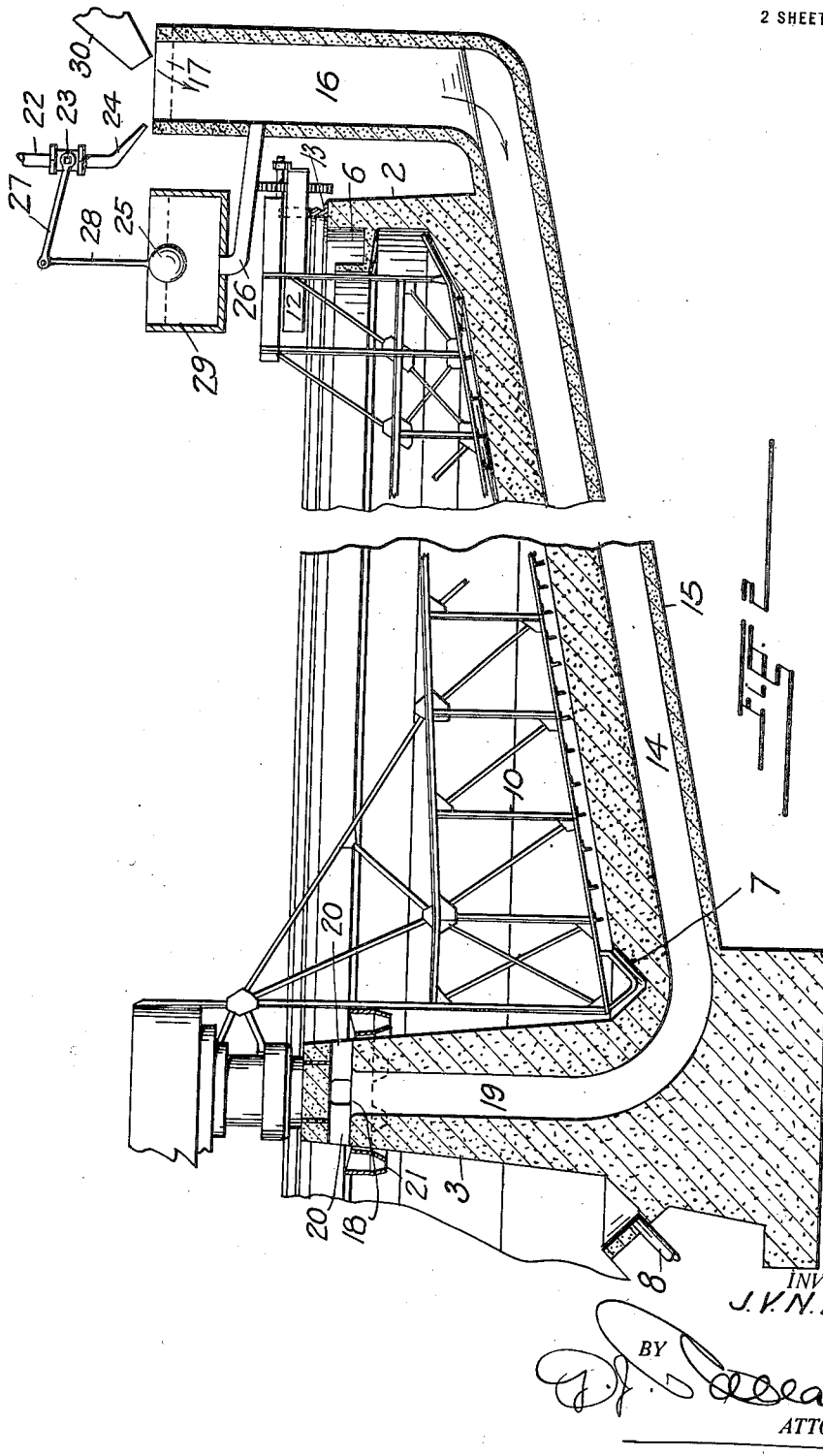

Patented Nov. 7, 1922.

1,434,597

UNITED STATES PATENT OFFICE.

JOHN V. N. DORR, OF NEW CANAAN, CONNECTICUT.

SETTLING APPARATUS.

Application filed February 2, 1920. Serial No. 355,605.

*To all whom it may concern:*

Be it known that I, JOHN V. N. DORR, a citizen of the United States, residing at New Canaan, in the county of Fairfield and State of Connecticut, have invented certain new and useful Improvements in Settling Apparatus, of which the following is a specification.

This invention relates to apparatus for settling solids out of liquids, of the class commonly known as "thickeners," and the object of the present invention is to provide a method of feeding ore pulp or other material in liquid into a settling tank at or near the liquid level thereof without the use of overhead structures.

My invention is particularly applicable to tanks of large diameter which ordinarily require the use of an undesirably long launder to conduct the feed to a central point, and it is also advantageous under conditions which make the saving of head room over the tank, a desideratum.

With these objects in view, my invention consists in providing a bend conduit passing underneath the tank with one of its limbs extending upwardly in the center thereof and with its other limb extending in the same direction outside the circumferential wall of the tank.

The outer limb of the conduit into which the material is fed from a conveniently located source of supply, extends at a higher elevation than the inner limb through which the material is discharged at or near the level of the liquid contents of the tank, whereby to provide a static head of sufficient volume to compensate for the frictional resistance to the flow of the material through the conduit.

An automatically controlled water-supply used in connection with the feeding appliance serves to prevent obstruction of the conduit by accumulating matter in case the feed is diminished or discontinued.

An embodiment of my invention has been shown in the accompanying drawings in which—

Figure 1 represents a sectional plan view of a settling tank to which my invention is applied, and Figure 2, an enlarged section on the line 2—2, Figure 1.

Referring more specifically to the drawings, the reference character 2 designates a cylindrical tank constructed of cement or other suitable material which has a central pier or column 3 for the support of a scraping mechanism, and a peripheral launder 6 for the overflow of liquid rising out of settling solids.

The bottom of the tank slopes from its periphery to a depression 7 around the foot of the column, which connects with a conduit 8 for the discharge of thickened matter.

The before-mentioned scraping mechanism is mounted on the central column for rotation about its vertical axis and it comprises a plurality of radial arms 9 extending above the bottom surface of the tank and equipped with transversely extending blades which convey the material settling to the bottom of the vessel toward the central discharge region defined by the annular depression 7.

The scraping element is operated through the intermediary of a radial sweep 10 the outer extremity of which is connected with a wheeled carriage 12 travelling on a track 13 laid upon the circumferential wall of the tank.

The sweep which in the construction shown in the drawings is submerged below the water level established by the overflow is equipped with scrapers similar to those on the radiating arms, and the carriage may be impelled by electricity supplied from a conveniently located source or by any other motive power.

The feed-conduit 14 of the present invention is formed partly in the upright column 3 and the foundation 15 of the settling tank and partly in a stand pipe 16 erected exteriorly of the same.

The inlet 17 at the upper end of the stand pipe is at a higher elevation than the outlet 18 at the end of the passage of the column to provide the static head necessary to compensate for the frictional resistance to the flow of material.

The inner limb 19 of the conduit, in the column of the tank, connects at its discharge end with a plurality of outlets 20 in the column which discharge into a circular distributing box 21 preferably connected with the rotating scraping mechanism.

In the operation of the apparatus, the material fed into the inlet 17 of the conduit from a superposed launder 30, passes through the conduit under the static head produced by the difference in elevations of the openings at the ends of its parallel limbs, and enters the tank at or near the liquid level determined by its overflow.

The rotating distributing box scatters the material over a wider area and the rotating scrapers move the solids settling out of liquid to the bottom surface of the tank, in a thickened condition to the central discharge opening.

It will be seen that the provision of a feed-conduit of the character described, eliminates the costly installation of a long overhead launder to carry the feed to the center of the tank, and that it also saves the head room above the tank which is of particular value where it is desired to submerge only part of the scraping mechanism as in industries requiring acid-proof equipment for handling acid solutions.

A safety appliance operates at the feed-opening of the conduit to prevent obstruction by accumulating solids in case the feed is diminished or discontinued, by a supply of water or other liquid which replaces the interrupted feed and flushes the conduit.

The appliance as shown in the drawings, consists of a float box 29 placed on a level with the upper end of the conduit and communicating therewith by a pipe 26 which maintains a liquid level in the box corresponding with that in the conduit.

A float 25 supported on the surface of the liquid in the box is operatively connected with a crank-arm 27 on a valve 23 which controls the flow of water through a supply pipe 22 above the entrance of the conduit.

Under ordinary conditions, the valve is held in a closed position by the float resting on the liquid in the float box when it is at its normal level above that of the outlet 18 of the conduit in the settling vessel.

When the feed is either diminished or discontinued, the correspondingly falling level of the liquid in the float box causes the float to drop, with the result that the valve in the conduit 22 is opened and a supply of water is admitted to the conduit. The liquid replacing the interrupted feed, flushes the conduit and prevents its obstruction by accumulation of solids.

It should be understood that it is not my desire to be limited to the exact details of construction of the safety appliance and the feeding-apparatus in general as shown and described and that variations in the construction and arrangement of their parts may be resorted to within the principle of my invention.

Having thus described my invention what I claim and desire to secure by Letters Patent is:

1. The combination with a thickener having a settling surface beneath a determined liquid-level, a central pier for the support of a scraping mechanism and an outlet adjacent the foot of said pier, of a feed conduit comprising a limb extending upwardly through said pier and having a discharge opening adjacent said liquid level, a limb exteriorly of the vessel and having an opening to admit the feed, at a higher elevation, and a connection between said limbs beneath the settling surface.

2. The combination with a thickener having a settling surface beneath a determined liquid-level, a central pier and an outlet adjacent the foot of said pier, of a feed conduit comprising a limb extending upwardly through said pier and having a discharge opening adjacent said liquid level, a limb exteriorly of the vessel and having an opening to admit the feed, at a higher elevation, and a connection between said limbs beneath the settling surface, and a distributing trough having a rotary movement on said pier and disposed to receive the material passing through said discharge-opening.

3. The combination with a thickener having a settling surface beneath a determinate liquid level and an outlet in said surface, of a feed conduit having two upwardly extending limbs respectively inside and outside the vessel and a connection at the lower ends thereof, the inner limb having a discharge opening in proximity to said liquid level and the other limb having an opening to admit the feed at a higher elevation, and a rotary distributing trough disposed to receive matter passing through said discharge opening.

4. The combination with a thickener having a settling surface, an outlet therein and means for maintaining a determinate liquid level above said surface, of a feed conduit having two upwardly extending limbs respectively inside and outside the vessel and connected at their lower ends, the limb of the conduit inside the vessel having a discharge opening in proximity to said liquid level and the other limb having an opening to admit the feed at a higher elevation, a supply pipe, and an appliance operating by variations in a liquid level in said outer limb to automatically regulate the flow of liquid through said supply pipe, and comprising a valve in the pipe, a vessel in communication with the outer limb of the feed conduit, and a float operatively connected with the valve and supported upon the liquid in said vessel.

In testimony whereof I have affixed my signature.

JOHN V. N. DORR.